Patented Oct. 9, 1928.

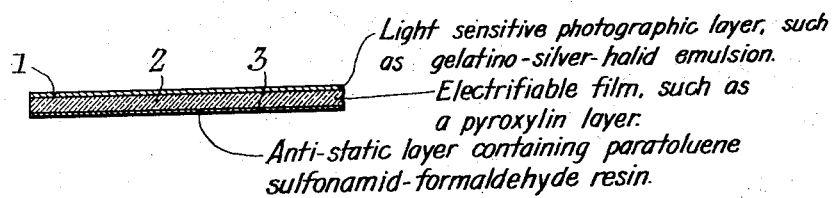

1,687,041

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

NONSTATIC PHOTOGRAPHIC FILM AND FILM BASE THEREFOR.

Application filed August 12, 1927. Serial No. 212,568.

This invention relates to non-static photographic film and to the base or support thereof. One object of the invention is to provide such a film which will have the usual qualities required to meet commercial conditions and will have, in addition, the ability to prevent or greatly lessen defects due to electrical discharges which are customarily referred to as "static" markings. Other objects will hereinafter appear.

In the accompanying drawing, the single figure is a diagrammatic section, upon an enlarged scale, of a photographic antistatic film embodying my invention.

I have found that a photographic film in which the light-sensitive photographic layer, such as a gelatino-silver-halide emulsion, is carried by an electrifiable base or support, can be rendered substantially antistatic by providing it with a layer or backing containing a paratoluene sulfonamid-formaldehyde resin. This backing is on the face of the support opposite to the one carrying the emulsion. Only a very thin layer, relative to the thickness of the support, is required to bring about the antistatic result. It is, therefore, comparatively inexpensive to carry out my invention.

In the preferred form of my invention, which will be described in detail by way of illustration, I dissolve 3 parts by weight of the paratoluene sulfonamid-formaldehyde resin in 97 parts by weight of acetone. The surface of the support to be coated is then brought very rapidly into and out of contact with this solution, so as to evenly and thoroughly coat it with a very thin layer. The acetone rapidly evaporates, leaving a sufficiently hard backing, and yet the acetone insures a strong bond between the paratoluene sulfonamid-formaldehyde resin and the pyroxylin or other electrifiable film support. Of course, in place of acetone, any other volatile solvent, common to the electrifiable support and the paratoluene sulfonamid-formaldehyde resin, can be employed.

Referring to the accompanying drawing, 1 is a light-sensitive photographic layer, such as a gelatino-silver-halide emulsion,— say a negative motion picture emulsion. 2 is the electrifiable film support, such as a transparent, flexible, strong, waterproof, pyroxylin layer, like that customarily employed in motion picture film. 3 is the antistatic layer or backing containing the paratoluene sulfonamid-formaldehyde resin. In the thin layer which I employ, this resin is substantially colorless, transparent, flexible and waterproof.

The paratoluene sulfonamid-formaldehyde resin varies from a semisolid to a solid, clear, transparent mass which can be rendered soft by heating. Although it is a polymer, it is permanently fusible and is soluble in the usual volatile organic solvents, such as acetone, mentioned above. Since static manifestations are most apt to occur upon developing motion picture negative film that has been exposed under particularly dry atmospheric conditions, my invention is at the present time of most utility in rendering such film antistatic.

Having thus described my invention, what I claim as new and desire to secure by Letters Patent is:

1. A flexible, photographic film comprising an electrifiable support carrying on one face a light-sensitive photographic coating and on the other face an antistatic layer containing paratoluene sulfonamid-formaldehyde resin.

2. A flexible motion picture film comprising a pyroxylin support carrying on one face a gelatino-silver-halide emulsion and on the other face an antistatic layer containing paratoluene sulfonamid-formaldehyde resin.

3. A flexible, transparent, laminated support adapted to receive light-sensitive photographic coatings, which comprises a main nitrocellulose layer and a relatively thinner layer containing paratoluene sulfonamid-formaldehyde resin.

Signed at Rochester, New York, this 4th day of August 1927.

PAUL C. SEEL.